United States Patent [19]

Holman

[11] 4,122,236

[45] Oct. 24, 1978

[54] ARTIFICIAL BOARD OF LUMBER AND METHOD FOR MANUFACTURING SAME

[76] Inventor: John A. Holman, 1206 Rutledge Way, Anderson, S.C. 29621

[21] Appl. No.: 795,203

[22] Filed: May 9, 1977

[51] Int. Cl.[2] .......... B32B 9/04

[52] U.S. Cl. .......... 428/453; 156/62.2; 156/288; 156/289; 264/128; 428/528; 428/529; 428/535; 428/537; 428/538; 428/539

[58] Field of Search .......... 428/537, 528, 529, 535, 428/453, 538, 539, 541; 264/45, 128; 156/62.2, 288, 289

[56] References Cited

U.S. PATENT DOCUMENTS

| | | | |
|---|---|---|---|
| 2,817,617 | 12/1957 | Rogers | 428/528 |
| 3,054,706 | 9/1962 | Glaubert | 428/528 |
| 3,671,377 | 6/1972 | Marra | 264/128 |
| 3,854,987 | 12/1974 | Michael | 428/453 |

*Primary Examiner*—Marion E. McCamish
*Attorney, Agent, or Firm*—Bailey, Dority & Flint

[57] ABSTRACT

An elongated board of artificial lumber having a length greater than the width and thickness comprising a mixture of irregularly shaped elongated splinters of wood substantially aligned along the length of the board; a substantial portion of the mixture including splinters from about 2" to 10" long; a sealant coating the surface of the splinters; an adhesive carried on the splinters with the sealant restricting the penetration of the adhesive into the splinters so as to produce hardened layers between the splinters for holding the splinters in an interlocking configuration.

9 Claims, 4 Drawing Figures

ARTIFICIAL BOARD OF LUMBER AND METHOD FOR MANUFACTURING SAME

BACKGROUND OF THE INVENTION

The present invention relates to artificial lumber and, more particularly, to an elongated board of artificial lumber which has the strength comparable to construction grade lumber.

It is well known that artificial boards can be produced by compressing a mixture of wood fibers and adhesive together under temperature and pressure to form pressboard and the like. One problem with such boards is that they are relatively weak in strength.

In an attempt to increase the strength of the board longitudinally extending reinforcing members such as fiberglass was inserted in the board. Examples of such reinforced artificial lumber is disclosed in U.S. Pat. Nos. 3,890,077 and 2,847,733.

One problem with reinforced wood is that it is expensive due to the processing as well as the cost of the reinforcing material itself.

Heretofore, in order to minimize the amount of resins or adhesives necessary for securing the wood particles together in forming particle boards, sometimes a sizing resin was first placed on the wood particles. Examples of such are disclosed in U.S. Pat. Nos. 3,287,479 and 3,958,467.

Examples of other types of particle boards are disclosed in U.S. Pat. Nos. 3,202,743, 3,245,867, and 3,493,527.

SUMMARY OF THE INVENTION

The invention pertains to an artificial board of lumber and to the method of making the artificial board of lumber. An elongated board of artificial lumber constructed in accordance with the present invention has a length greater than the width and thickness. A mixture of irregularly shaped elongated splinters of wood are substantially aligned along the length of the board. A substantial portion of the splinters are from about two to ten inches long. The fibers which make up the splinters are parallel to the length of the splinters as a result of being cut from a log with a cutter blade which moves perpendicularly to the length of the log when cutting into the log. The splinters are dried and a sealant is placed on the surface thereof so as to minimize the impregnation of an adhesive into the splinters when subsequently applied thereto. The adhesive binder is placed on the irregularly shaped sealed splinters and the splinters are compressed into an interlocking configuration with the adhesive coating forming hardened layers of continuous reinforcing lines running the length of the board. As a result of the cross section of the splinters being up to three-quarters of an inch wide, the hardened layers of adhesive create a honeycomb configuration which runs the length of the board. The adhesive layer may be cured in any suitable manner such as by heating. As a result of the compression of the board, the interlocking of the splinters and the reinforcing adhesive layers, a construction board is formed having a strength comparable to yellow pine or Douglas fir.

Accordingly, it is an object of the present invention to provide an artificial board of lumber which is structural strong and has working characteristics similar to natural lumber.

Another important object of the present invention is to provide a method for producing artificial lumber of any dimensions having a strength comparable to construction wood such as southern yellow pine or Douglas fir.

Still another important object of the present invention is to provide an artificial board of lumber and the method of making such which can be readily treated during the manufacture thereof so as to make the lumber fire retardant and rot-resistant.

These and other objects and advantages of the invention will become apparent upon reference to the following specification, attendant claims and drawing.

DESCRIPTION OF A PREFERRED EMBODIMENT

Figure 1:
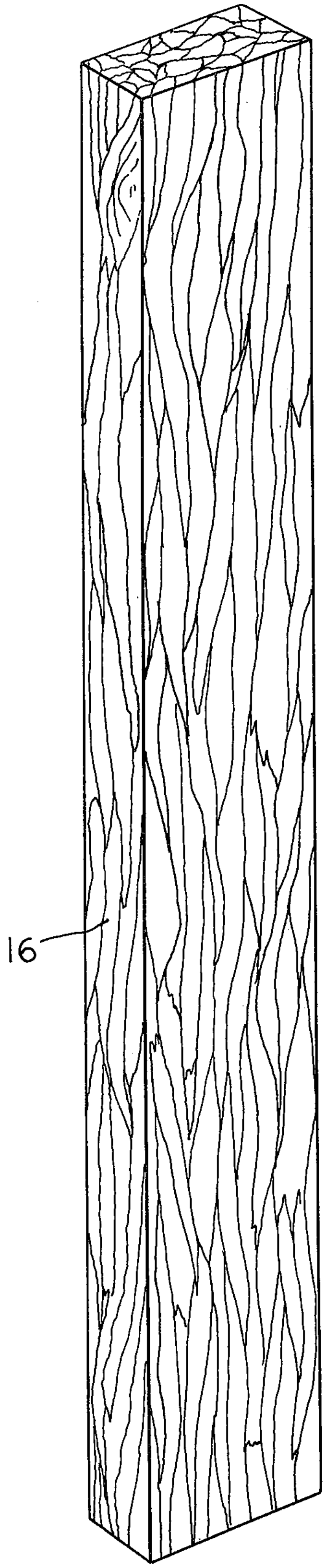
FIG. 1 is a perspective view illustrating an artificial board constructed in accordance with the present invention.
Figure 3:
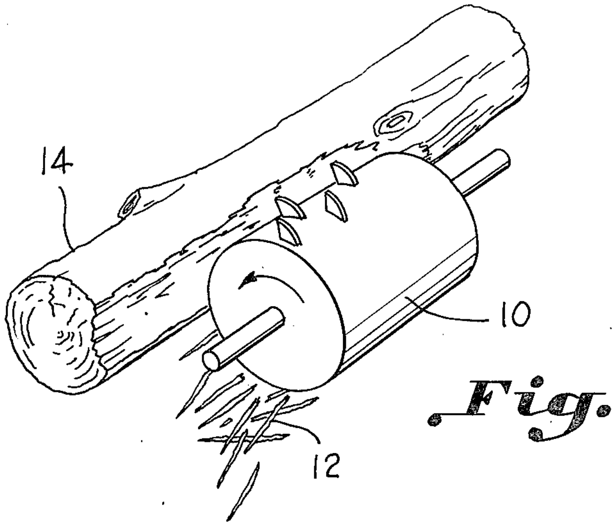
FIG. 3 is a diagrammatic perspective view illustrating the cutting of elongated splinters from a log with the cutting blade moving perpendicular to the length of the log.

Referring to FIG. 3 of the drawing, there is illustrated a rotating cutter head 10 cutting splinters 12 from a pine log 14. It is noted that the cutter head is moving in a direction perpendicular to the grain or length of the log so that the splinters 12 extend up to 8 or 10 inches in length and have a cross section up to about three-quarters of an inch.

By cutting the splinters from the log perpendicular to the length, such causes the splinters to be irregularly shaped with the fibers thereof being aligned along the length of the splinter.

Figure 4:
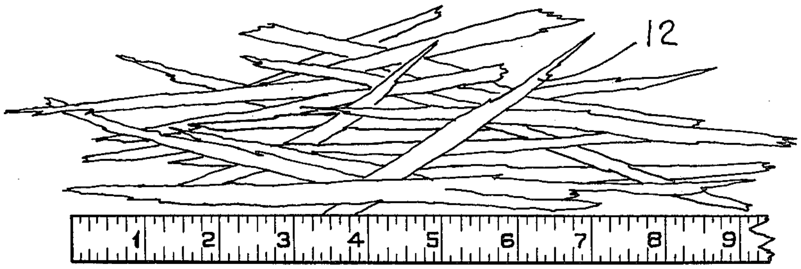
FIG. 4 is a perspective view illustrating a typical pile of splinters and the size thereof used in making the artificial board of FIG. 1.

FIG. 4 illustrates a typical pile of splinters cut from a log. In a preferred embodiment, 60 to 70 percent of the splinters are cut from 2 to 8 inches long. The remaining 30 to 40 percent of the splinters are normally smaller than 2 inches and act as fillers when compressed to form the artificial board.

After the splinters are cut from the log, they are dried to about 10 percent moisture and a sealant is sprayed on the splinters. The splinters are tumbled so as to uniformly coat the splinters with the sealant.

In one particular application, sodium metasilicate is used for coating the splinters. The commercially available sodium metasilicate which can be purchased from E. I. DuPont Co. and referred to as sodium silicate #16 is diluted to approximately twenty percent solids. The reason for the dilution is to enable the solution to be sprayed readily by presently available equipment.

Normally, the spray of sodium metasilicate is applied to the splinters at a ratio of 3 to 5% solids by weight of wood. It is to be understood, of course, that other suitable conventional sizing agents could be utilized for the splinters.

After the sealant has been applied to the splinters and the splinters tumbled and dried so as to form a stiffening surface coating on the splinters, an adhesive is applied to the splinters. Since the splinters have been sealed with the sodium metasilicate, the adhesive adheres to the surface of the splinters rather than penetrating into the wood. Any suitable conventional adhesive and catalyst normally used in making press board can be utilized.

In one particular embodiment, the adhesive is a modified and sulfonated phenol-formaldehyde resin with a curing catalyst. A typical resin is manufactured by Georgia Pacific Corporation and is referred to as GP-5103. In normal coating, 110 pounds of glue based on 100 percent solids is used for coating 2200 pounds of pine wood splinters for making 1000 board feet of lumber. The following is a typical mixture of wood, adhesive, filler and catalyst for making a 1000 board feet of artificial lumber.

2200 lbs. of splinters coated with sodium metasilicate,
203.7 lbs. of liquid adhesive GP-5103 which is 54% solids,
10.18 lbs of catalyst which is an organic acid aqueous solution such as GP × 1091/62 purchased from Georgia Pacific Corporation,
40.7 lbs. of calcium carbonate filler which adds strength to the glue line in the wood.

The above is compressed under about 600 p.s.i. and cured at 325° Fahrenheit.

After the splinters have been coated with the adhesive, they are then compressed under pressure on a continuous board producing apparatus such as disclosed in U.S. Pat. No. 3,890,077 or may be pressed under pressure on a conventional press board manufacturing press. Normally, a pressure of 400 to 700 lbs./sq. in. is applied to all sides of the board. Prior to the splinters being compressed, they are aligned either manually or mechanically along the desired length of the board.

After the splinters have been compressed into the shape of the desired board, heat is applied to the board for curing the adhesive and locking the splinters into position. As the elongated splinters are compressed, they become interlocked due to the irregular shape thereof with the ends of some splinters bending around the ends of adjacent splinters.

Figure 2:
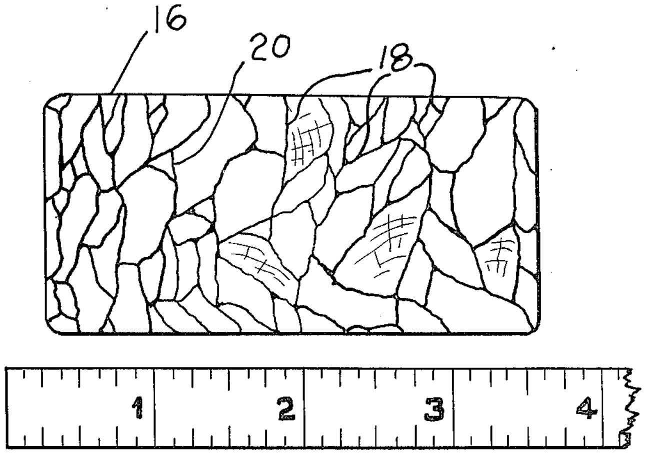
FIG. 2 is an end view of the elongated artificial board of FIG. 1.

The cured adhesive layer takes the configuration of a honeycomb such as illustrated in FIG. 2 which extends throughout the length of the board increasing the modulus of elasticity.

The following are tests that were performed on boards commonly referred to as 2 × 4's which have a cross sectional dimension of 1½ inches by 3½ inches and a length of about 42 inches.

| Test No. | |
|---|---|
| 1 | Board produced from mostly yellow pine sawdust:<br>128,360 modulus of elasticity<br>164,232 modulus of elasticity<br>108,462 modulus of elasticity<br>Average - 132,351 modulus of elasticity |
| 2 | Board produced from mostly yellow pine sawdust to 1/2" long, 1/2" wide and 1/8" thick:<br>398,291 modulus of elasticity<br>209,339 modulus of elasticity<br>421,757 modulus of elasticity<br>Average - 343,129 modulus of elasticity |
| 3 | Board produced from yellow pine - A mixture of about 50% Pallman and 50% Bauer fibers. Fibers up to 1" long and chips and particles from sawdust to 1/2" × 1/2" × 3/4":<br>306,232 modulus of elasticity<br>128,302 modulus of elasticity<br>286,138 modulus of elasticity<br>146,521 modulus of elasticity<br>Average - 216,798 modulus of elasticity |
| 4 | Board made from Hercules spent fibers resulting from processed pine stumps. 1/2" to 3/4" long with a fibrous cross section:<br>267,000 modulus of elasticity<br>197,000 modulus of elasticity<br>394,000 modulus of elasticity<br>Average: 286,000 modulus of elasticity |
| 5 | Board made from Douglas fir fingerlings - 1" to 2" long, 1/4" to 1/3" wide, 1/64" thick.<br>521,242 modulus of elasticity |
| 6 | Board made from short cycle Sycamore shavings cut on a planar head - 1" to 4" long with 80% in 2" to 4" range, 1/8" to 3/4" wide, 1/32 to 1/8" thick:<br>622,424 modulus of elasticity<br>653,231 modulus of elasticity<br>637,500 modulus of elasticity<br>Average: 637,718 modulus of elasticity |
| 7 | Board made from pine splinters - 80:% between 2" and 5" long, splinters up to 1/2" thick.<br>756,548 modulus of elasticity<br>796,341 modulus of elasticity<br>788,000 modulus of elasticity<br>631,000 modulus of elasticity<br>Average: 742,920 modulus of elasticity |
| 8 | Board made from pine splinters -<br>75% - 6" to 8" long<br>25% - random lengths up to 6" long<br>Thickness to 1/4", width to 3/4"<br>1,074,000 modulus of elasticity<br>1,099,900 modulus of elasticity<br>976,500 modulus of elasticity<br>884,300 modulus of elasticity<br>Average: 1,008,450 modulus of elasticity |
| 9 | Board made from pine splinters -<br>75% - 2" to 10" long, thickness to 1/4", width 1/4" to 3/4"<br>1,231,000 modulus of elasticity<br>982,500 modulus of elasticity<br>734,250 modulus of elasticity<br>Average: 986,000 modulus of elasticity |

The modulus of elasticity for the various boards as shown above increases with the length of the splinters up to approximately 8 inches.

As a result of the splinters being irregularly shaped, after forming and compression, a wave or wood grain effect is produced so that there is no definite shear plane along the board 16. The glue line 18 extending through the board takes the form of a honeycomb configuration 20 which extends throughout the length of the board. This results from the glue forming on the surface of the wood rather than penetrating into the wood splinters. As previously mentioned, the glue does not penetrate into the wood splinters since the splinters are coated with a sealant such as sodium metasilicate. The advantage of using sodium metasilicate is that it adds stiffness to the splinters. The calcium carbonate filler which is added to the adhesive adds strength to the glue line.

Since the splinters are wood, the artificial board nails and saws similar to natural wood and, therefore, is acceptable to the building trade. The splinters require little energy to make and a minimum amount of energy is used in the total manufacture. In other words, the artificial board is substantially recreating nature's product so that the wood splinters are similar to the spring growth and the honeycomb adhesive configuration is similar to the summer growth of Another feature of the artificial board constructed in accordance with the present invention is that it can readily be made fire retardant by adding aluminum hydrate to the adhesive for making the glue line fire retardant and treating the splinters with aluminum phosphate. The artificial board would become more fire retardant since these splinters can be effectively coated with the fire retardant.

The wood can also be made rot-resistant by similar treatment of the splinters with any suitable rot retardant such as pentachlorophenol.

The splinters shown in FIG. 4 are drawn to scale with the ruler lined off in inches so as to illustrate a typical pile of splinters used in making the artificial board 16. Similarly, the end of the board 16 is drawn to scale with the ruler position adjacent thereto.

While a preferred embodiment of the invention has been described using specific terms, such description is for illustrative purposes only, and it is to be understood that changes and variations may be made without departing from the spirit or scope of the following claims.

What is claimed is:

1. An elongated board of artificial lumber having a length greater than the width and thickness comprising:
   - a mixture of irregularly shaped elongated splinters of wood substantially aligned along the length of said board,
   - a substantial portion of said splinters being from about two to eight inches long,
   - a sealant coating the surface of said splinters,
   - an adhesive coating carried on said irregularly shaped elongated splinters with said sealant restricting the penetration of said adhesive into said splinters,
   - said splinters being compressed into an interlocking configuration, with said adhesive coating forming hardened longitudinally extending layers between said splinters holding said splinters in said interlocking configuration.

2. An elongated board of artificial lumber having a length greater than the width and thickness comprising:
   - a mixture of irregularly shaped elongated splinters of wood fibers substantially aligned along the length of said board,
   - said splinters being of irregular cross section having been torn or cut from logs perpendicular to the length of the logs,
   - a substantial portion of said splinters being from 2 to 10 inches long,
   - a sealant coating the surface of said splinters,
   - an adhesive carried on said splinters with said sealant restricting the penetration of said adhesive into said splinters,
   - said splinters being compressed into an interlocking configuration with said adhesive forming hardened longitudinally extending layers between said splinters holding said splinters in said interlocking configuration.

3. The elongated board of artificial lumber as set forth in claim 2 wherein about sixty percent of said mixture of irregularly shaped elongated splinters are from about 2 to 8 inches in length.

4. An elongated board of artificial lumber having a length greater than than the width and thickness comprising:
   - a mixture of irregularly shaped elongated splinters of wood substantially aligned along the length of said board,
   - a substantial portion of said splinters being more than two inches long,
   - an adhesive coating carried on the surface of said irregularly shaped elongated splinters in a non penetrating manner,
   - said splinters being compressed into an interlocking configuration with said adhesive coating forming longitudinally extending hardened layers of reinforcing lines running the length of said board and having a honeycomb cross-section configuration.

5. The elongated board of artificial lumber as set forth in claim 4 wherein the cross section of said splinters extends up to about three-fourths of an inch.

6. The method of producing artificial lumber comprising the steps of:
   (a) cutting splinters of about two to ten inches from a log perpendicular to the length of the log,
   (b) drying said splinters,
   (c) coating said splinters with a sealant allowing said sealant to dry on said splinters,
   (d) applying an adhesive to said coated splinters with said sealant restricting the penetration of said adhesive into said splinters,
   (e) aligning said splinters so that said splinters are substantially parallel to each other,
   (f) compressing said aligned splinters and said adhesive with pressure into a predetermined shape, and
   (g) curing said compressed mixture of splinters and adhesive producing a hardened board of artificial lumber.

7. The method of producing artificial lumber as set forth in claim 6 wherein said sealant used for coating said splinters is sodium metasilicate.

8. The method of producing artificial lumber as set forth in claim 6 wherein said adhesive is a thermosetting resin.

9. The method of producing artificial lumber comprising the steps of:
   (a) assembling a mixture of elongated splinters wherein a substantial portion of said splinters are from two to eight inches long,
   (b) drying said splinters,
   (c) coating said splinters with an adhesive,
   (d) aligning said splinters so that said splinters are substantially parallel to each other,
   (e) compressing said aligned splinters and said adhesive with pressure into an elongated board, and
   (f) curing said adhesive forming a hardened honeycomb reinforcing configuration extending the length of said elongated board.

* * * * *